US009686426B2

(12) United States Patent
Oguma et al.

(10) Patent No.: US 9,686,426 B2
(45) Date of Patent: Jun. 20, 2017

(54) PULL PRINTING SYSTEM INCLUDING PRINTING DATA TRANSMITTER THAT TRANSMITS PULL PRINTING DATA AND STORAGE MEDIUM

(71) Applicant: KYOCERA Document Solutions Inc., Osaka (JP)

(72) Inventors: Takashi Oguma, Osaka (JP); Masafumi Sato, Osaka (JP); Zhenyu Sun, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/052,491

(22) Filed: Feb. 24, 2016

(65) Prior Publication Data
US 2016/0255208 A1 Sep. 1, 2016

(30) Foreign Application Priority Data

Feb. 27, 2015 (JP) .................. 2015-039560
Feb. 27, 2015 (JP) .................. 2015-039563

(51) Int. Cl.
*G06F 3/12* (2006.01)
*H04N 1/00* (2006.01)
(52) U.S. Cl.
CPC ......... *H04N 1/0023* (2013.01); *G06F 3/1211* (2013.01); *G06F 3/1286* (2013.01); *G06F 3/1287* (2013.01); *G06F 3/1289* (2013.01); *H04N 2201/0094* (2013.01)

(58) Field of Classification Search
CPC ..... H04N 1/0023; G06F 3/126; G06F 3/1229; G06F 3/1287
USPC ................................ 358/1.15, 1.16
See application file for complete search history.

(56) References Cited

U.S. PATENT DOCUMENTS

| 2008/0147821 | A1* | 6/2008 | Dietrich | G06F 17/30206 |
| | | | | 709/216 |
| 2009/0190166 | A1* | 7/2009 | Nakamura | G06F 3/1219 |
| | | | | 358/1.15 |
| 2015/0124290 | A1* | 5/2015 | Tajima | G06Q 10/10 |
| | | | | 358/1.15 |
| 2016/0088074 | A1* | 3/2016 | Kannan | H04L 67/1002 |
| | | | | 709/223 |

FOREIGN PATENT DOCUMENTS

JP 2014-081728 A 5/2014

* cited by examiner

*Primary Examiner* — Eric A Rust
(74) *Attorney, Agent, or Firm* — Studebaker & Brackett PC

(57) ABSTRACT

A pull printing system includes a plurality of storage destination devices that store printing data for pull printing, and a printing data transmitter. The printing data transmitter transmits the printing data for the pull printing to at least one of the plurality of storage destination devices. The printing data transmitter selects a storage destination device to which to transmit the printing data from among the plurality of storage destination devices based on specific conditions of each of the plurality of storage destination devices and on specific requirements with respect to the conditions.

6 Claims, 14 Drawing Sheets

80

| User ID | Job ID | Device ID |
|---------|--------|-----------|
| 001 | 001 | 1 |
| 001 | 012 | 1 |
| 001 | 035 | 2 |
| 001 | 093 | 2 |
| 001 | 231 | 3 |
| 002 | 003 | 1 |
| ⋮ | ⋮ | ⋮ |

PULL PRINTING SYSTEM INCLUDING PRINTING DATA TRANSMITTER THAT TRANSMITS PULL PRINTING DATA AND STORAGE MEDIUM

INCORPORATION BY REFERENCE

The present application claims priority under 35 U.S.C. §119 to Japanese Patent Application No. 2015-039560, filed on Feb. 27, 2015 and Japanese Patent Application No. 2015-039563, filed on Feb. 27, 2015. The contents of these applications are incorporated herein by reference in their entirety.

BACKGROUND

The present disclosure relates to a pull printing system including a printing data transmitter that transmits printing data for pull printing to a storage destination device that stores the printing data for the pull printing, and a storage medium storing a printing data transmission program.

There exists a typical pull printing system in which a pull printing server serving as a storage destination device in which to store printing data for pull printing and a client personal computer (PC) that transmits printing data to the pull printing server are connected to the same local area network (LAN). The pull printing system refers to a system that performs pull printing. The pull printing refers to a printing feature where printing data is stored in a specified storage destination device and an image forming apparatus performs printing based on the printing data stored in the storage destination device.

SUMMARY

A pull printing system according to an embodiment of the present disclosure includes a plurality of storage destination devices that store printing data for pull printing, and a printing data transmitter. The printing data transmitter transmits the printing data for the pull printing to at least one of the plurality of storage destination devices. The printing data transmitter selects a storage destination device to which to transmit the printing data from among the plurality of storage destination devices based on specific conditions of each of the plurality of storage destination devices and on specific requirements with respect to the specific conditions.

BRIEF DESCRIPTION OF THE DRAWINGS

FIG. 12 is a diagram illustrating an example of a list that is stored by the image forming apparatus illustrated in FIG. 4.

DETAILED DESCRIPTION

The following describes an embodiment of the present disclosure with reference to the accompanying drawings.

First, configuration of a pull printing system according to the present embodiment will be described.

Figure 1:
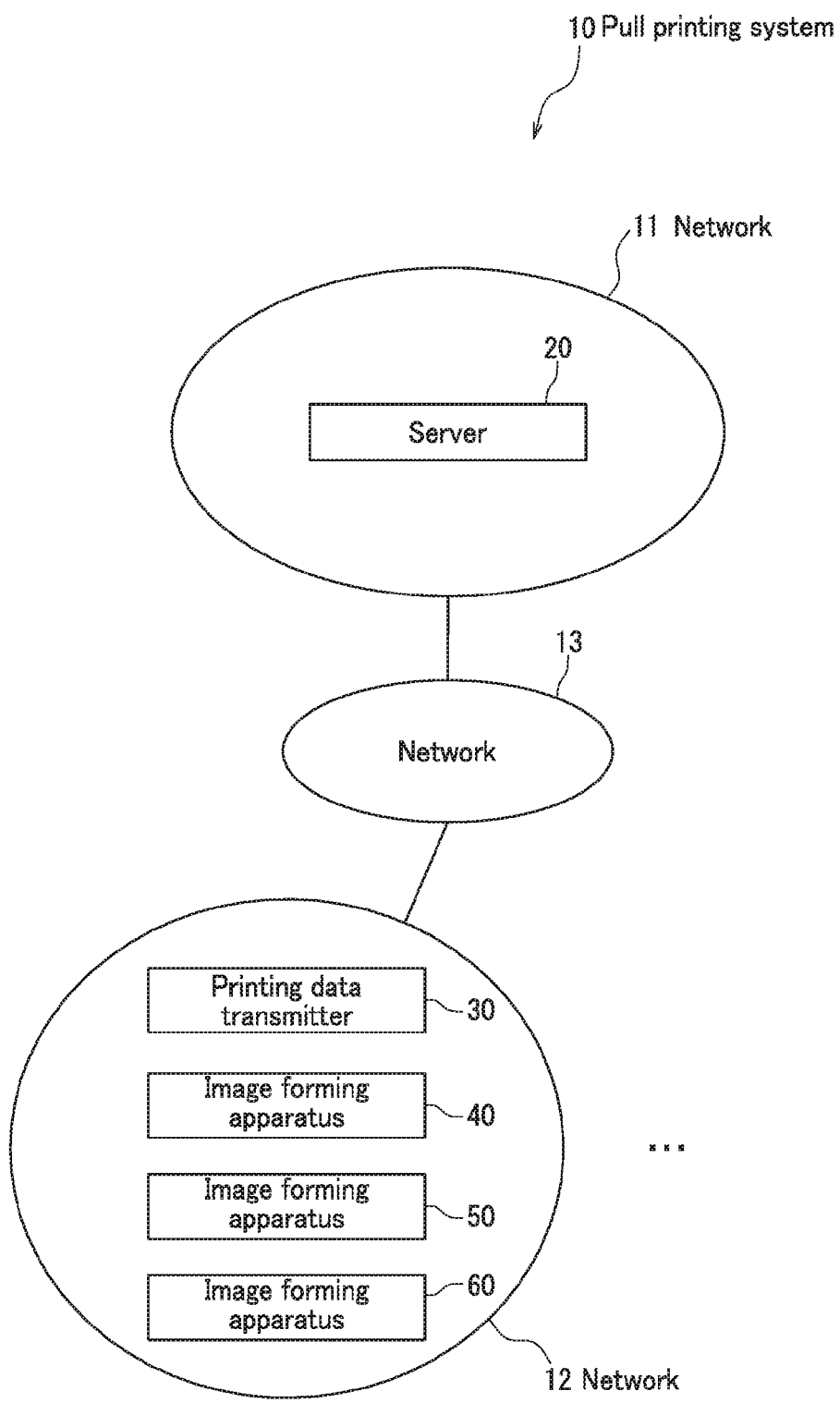
FIG. 1 is a block diagram of a pull printing system according to an embodiment of the present disclosure.

FIG. 1 is a block diagram of a pull printing system 10 according to the present embodiment.

As illustrated in FIG. 1, the pull printing system 10 includes a network 11 such as a local area network (LAN), a network 12 such as a LAN, a plurality of networks, not shown, that are similar to the network 12, and a network 13 such as the internet that connects the network 11 with the network 12. The network 13 also connects the network 11 with the plurality of networks, not shown, that are similar to the network 12.

A server 20 for storing printing data for pull printing is located in the network 11.

The server 20 for example includes one or more computers such as a personal computer (PC).

A printing data transmitter 30 that transmits printing data, and image forming apparatuses 40, 50, and 60 that each perform a print job based on printing data are located in the network 12.

A plurality of printing data transmitters other than the printing data transmitter 30 may be located in the network 12. However, in order to facilitate understanding, description of the printing data transmitters other than the printing data transmitter 30 will be omitted. A plurality of image forming apparatuses other than the image forming apparatuses 40, 50, and 60 may also be located in the network 12. However, in order to facilitate understanding, description of the image forming apparatuses other than the image forming apparatuses 40, 50, and 60 will be omitted.

The printing data transmitter 30 for example includes a computer such as a PC.

The image forming apparatuses 40, 50, and 60 are for example multifunction peripherals (MFPs) or printers.

The same types of devices as those located in the network 12 are located in the plurality of networks, not shown, that are similar to the network 12 among the networks in the pull printing system 10. Hereinafter, in order to facilitate understanding, description of the plurality of networks, not shown, that are similar to the network 12 among the networks in the pull printing system 10 will be omitted.

Figure 2:
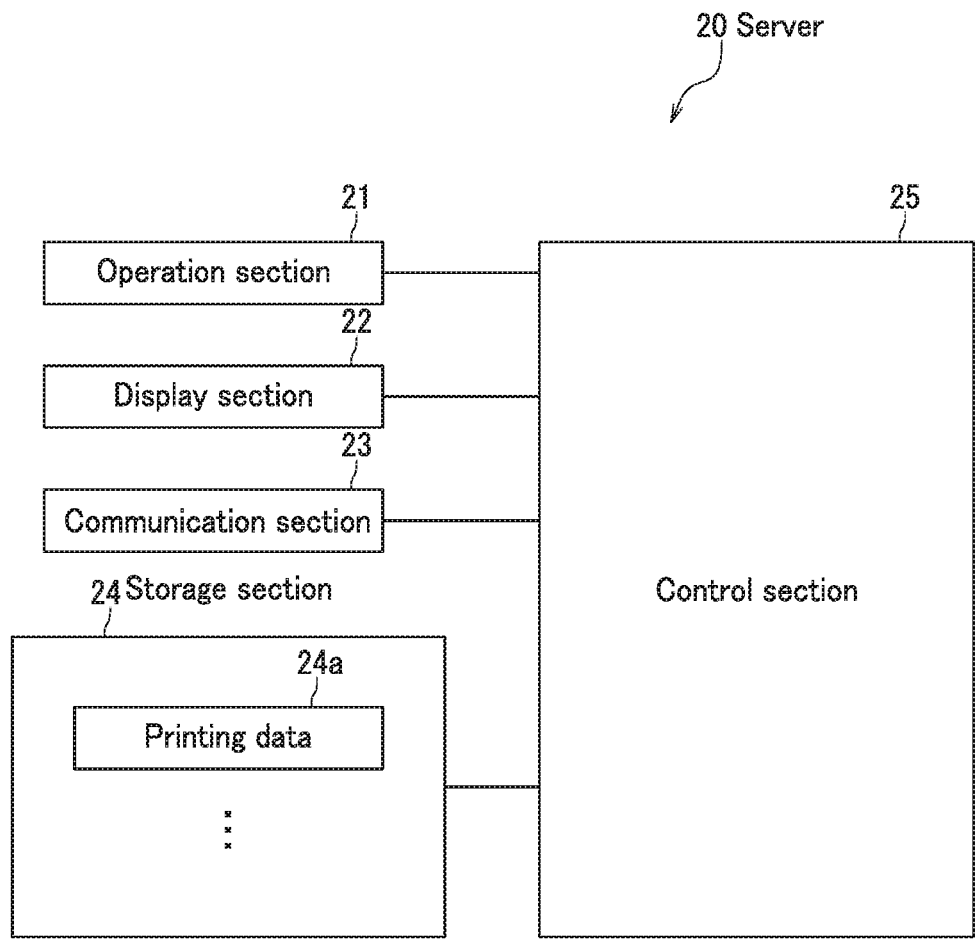
FIG. 2 is a block diagram of a server illustrated in FIG. 1.

FIG. 2 is a block diagram of the server 20.

As illustrated in FIG. 2, the server 20 includes an operation section 21, a display section 22, a communication section 23, a storage section 24, and a control section 25. The operation section 21 is an input device such as a set of buttons to be used by a user for inputting various operations. The display section 22 is a display device such as a liquid crystal display (LCD) that displays various pieces of information. The communication section 23 is a communication device that implements communication with an external device. The control section 25 performs overall control of the server 20.

The storage section 24 is capable of storing therein a plurality of pieces of printing data 24a for pull printing on a user-by-user basis. That is, the server 20 can function as a storage destination device in which to store printing data for pull printing.

The control section 25 for example includes a central processing unit (CPU), read only memory (ROM) storing thereon a program and various types of data, and random access memory (RAM) that is used as a work area of the CPU. The CPU executes a program stored in the ROM or in the storage section 24.

Figure 3:
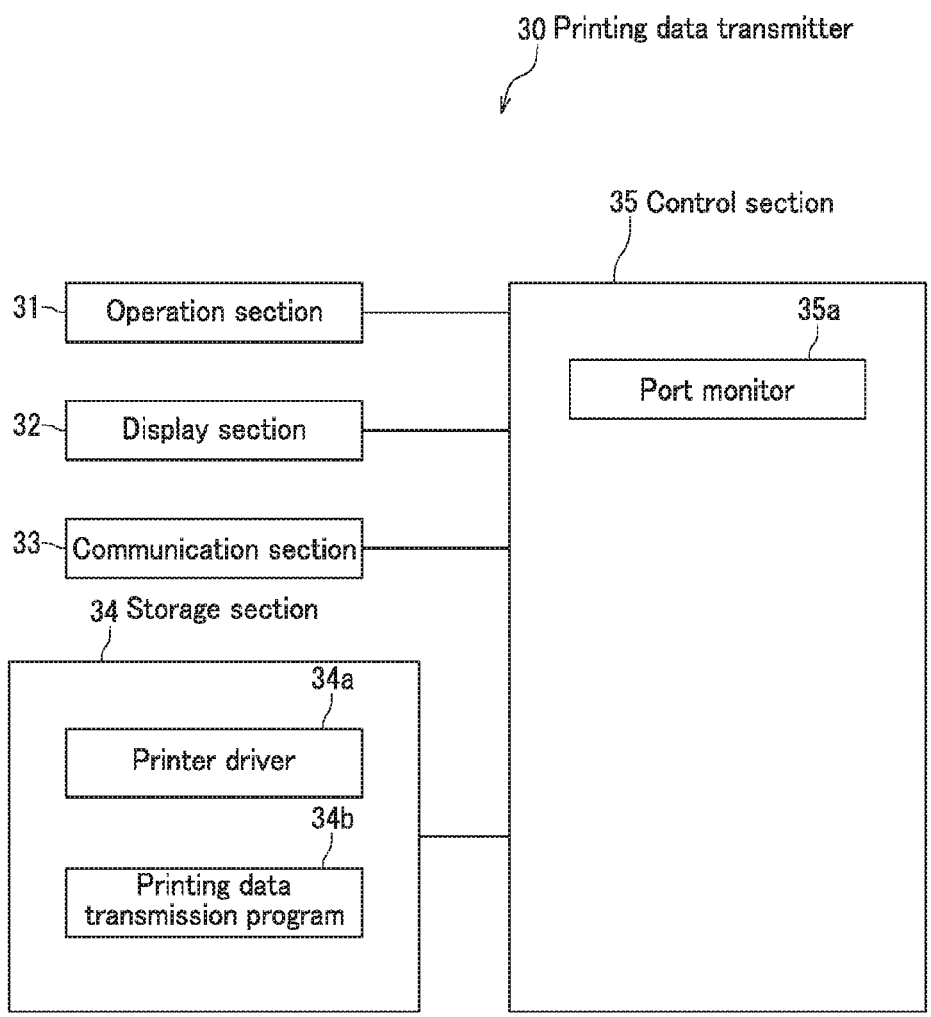
FIG. 3 is a block diagram of a printing data transmitter illustrated in FIG. 1.

FIG. 3 is a block diagram of the printing data transmitter 30.

As illustrated in FIG. 3, the printing data transmitter 30 includes an operation section 31, a display section 32, a communication section 33, a storage section 34, and a control section 35. The operation section 31 is an input device such as a keyboard and a mouse to be used by a user for inputting various operations. The display section 32 is a display device such as an LCD that displays various pieces of information. The communication section 33 is a communication device that implements communication with an external device. The storage section 34 is a storage device such as a MD used for storing various types of data. The control section 35 performs overall control of the printing data transmitter 30.

The storage section 34 stores therein a printer driver 34a for generating printing data and a printing data transmission program 34b for transmitting printing data to a storage destination device in which to store printing data for pull printing. The printer driver 34a and the printing data transmission program 34b may be installed on the printing data transmitter 30 during production of the printing data transmitter 30, or may be additionally installed on the printing data transmitter 30 from a storage medium such as a compact disk (CD) or a digital versatile disk (DVD), or may be additionally installed on the printing data transmitter 30 from a network.

The control section 35 for example includes a CPU, ROM storing thereon a program and various types of data, and RAM that is used as a work area of the CPU. The CPU executes a program stored in the ROM or in the storage section 34.

The control section 35 functions as a port monitor 35a via execution of the printing data transmission program 34b stored in the storage section 34. The port monitor 35a serves as a printing data transmitting section. The port monitor 35a transmits printing data to a storage destination device in which to store printing data for pull printing. In a case where there are a plurality of storage destination devices, the port monitor 35a transmits the printing data to at least one of the plurality of storage destination devices.

Figure 4:
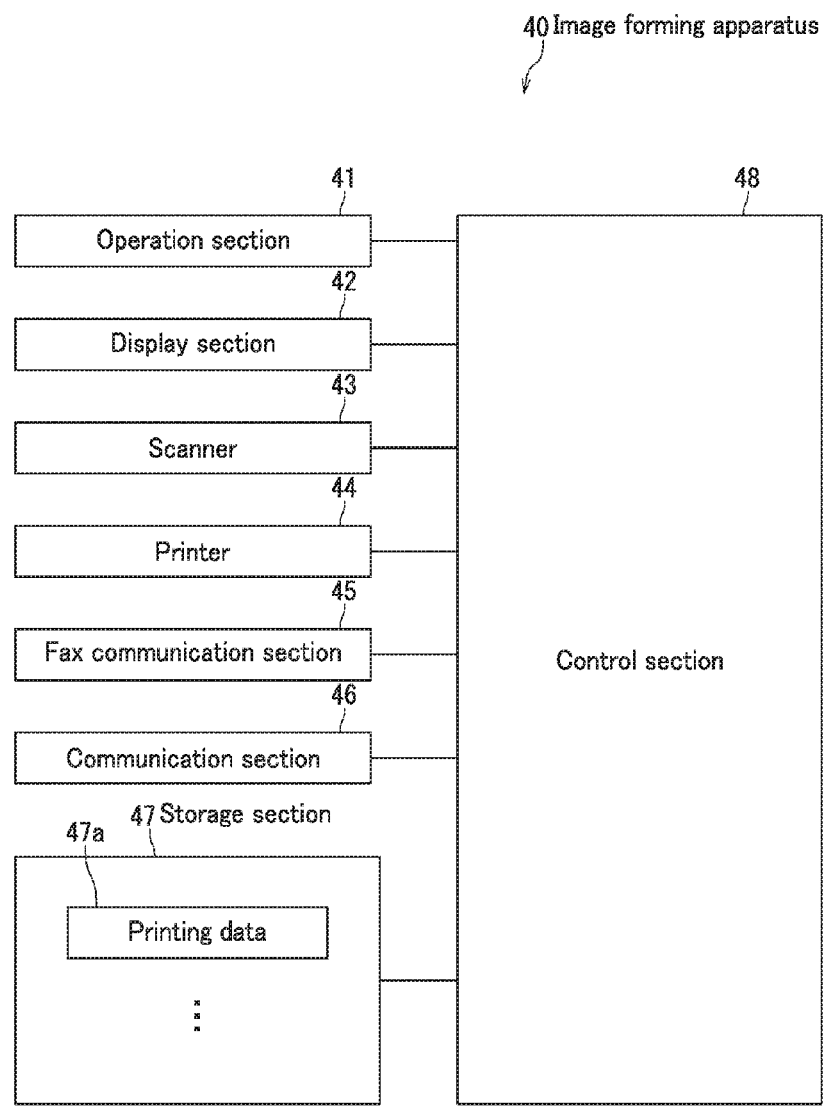
FIG. 4 is a block diagram of an image forming apparatus illustrated in FIG. 1.

FIG. 4 is a block diagram of the image forming apparatus 40.

As illustrated in FIG. 4, the image forming apparatus 40 includes an operation section 41, a display section 42, a scanner 43, a printer 44, a fax communication section 45, a communication section 46, a storage section 47, and a control section 48. The operation section 41 is an input device such as a set of buttons to be used by a user for inputting various operations. The display section 42 is a display device such as an LCD that displays various pieces of information. The scanner 43 is a scanning device that reads image data from an original document. The printer 44 is a printing device that performs printing on a recording medium such as paper. The fax communication section 45 is a fax device that performs fax communication with an external facsimile machine, not shown, via a communication line such as the public switched telephone network. The communication section 46 is a communication device that performs communication with an external device via the network 11 illustrated in FIG. 1. The storage section 47 is a storage device such as a HDD and electrically erasable programmable read only memory (EEPROM) storing thereon various types of data. The control section 48 performs overall control of the image forming apparatus 40.

The storage section 47 is capable of storing therein a plurality of pieces of printing data 47a for pull printing on a user-by-user basis. That is, the image forming apparatus 40 can function as a storage destination device in which to store printing data for pull printing.

The control section 48 for example includes a CPU, ROM storing thereon a program and various types of data, and RAM that is used as a work area of the CPU. The CPU executes a program stored in the ROM or in the storage section 47.

The image forming apparatuses 50 and 60 illustrated in FIG. 1 have the same configuration as the image forming apparatus 40, and therefore description thereof will be omitted.

Next, operations of the pull printing system 10 will be described.

First, an operation of the printing data transmitter 30 for setting a storage destination device in which to store printing data for pull printing will be described.

Figure 5:
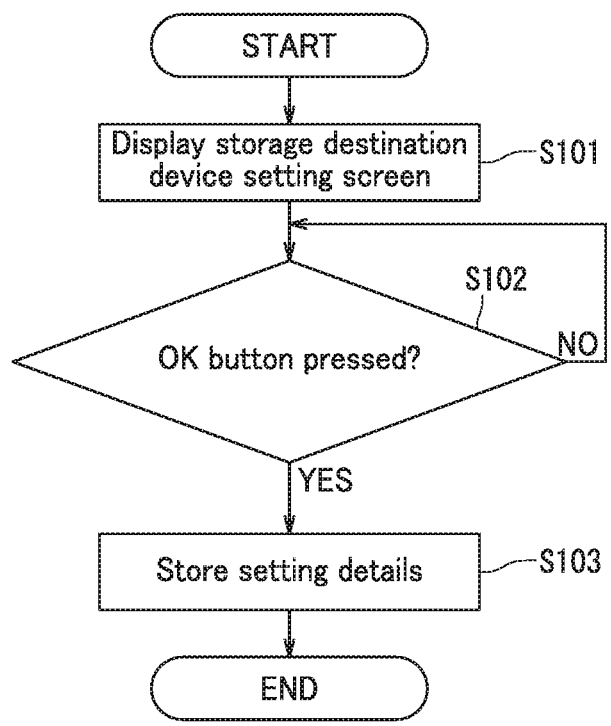
FIG. 5 is a flowchart of an operation of the printing data transmitter illustrated in FIG. 3 for setting a storage destination device in which to store printing data for pull printing.

When receiving an instruction to start setting a storage destination device in which to store printing data for pull printing from a user via the operation section 31, the printing data transmitter 30 performs an operation illustrated in FIG. 5.

FIG. 5 is a flowchart of an operation of the printing data transmitter 30 for setting a storage destination device in which to store printing data for pull printing.

Figure 6:
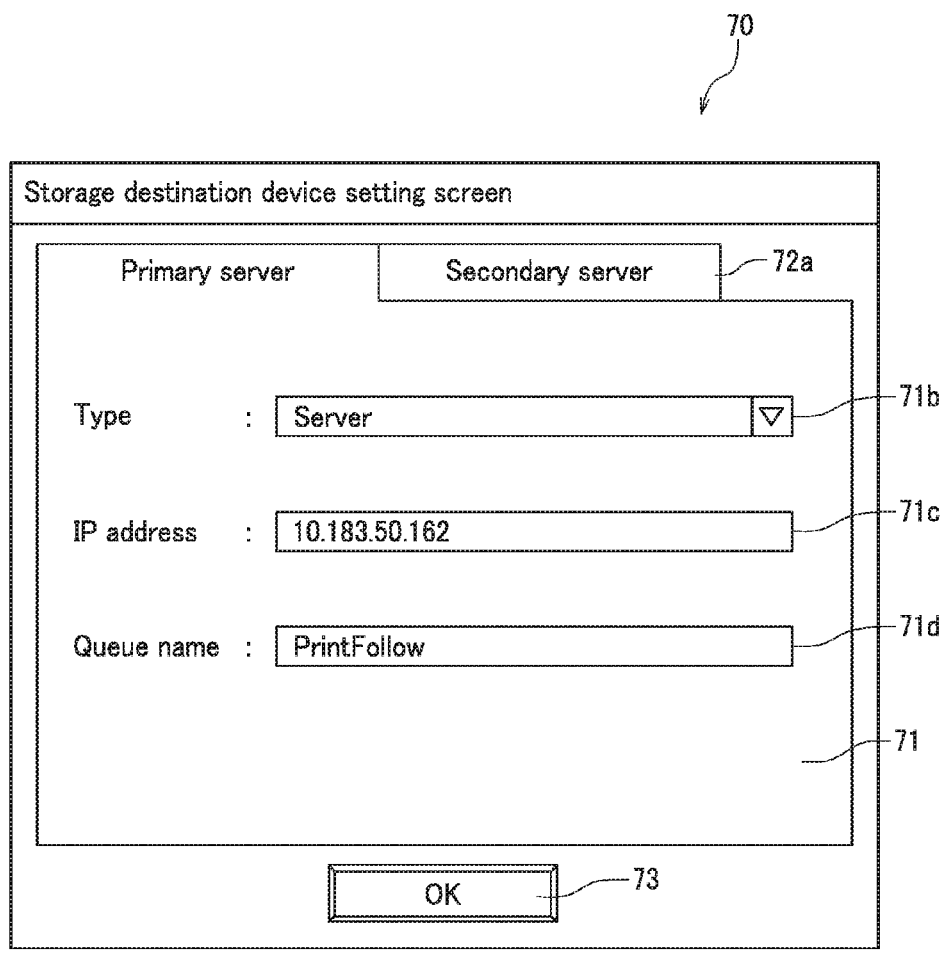
FIG. 6 is a diagram illustrating an example of a storage destination device setting screen that is displayed on a display section illustrated in FIG. 3.

As illustrated in FIG. 5, the port monitor 35a displays on the display section 32 a storage destination device setting screen 70 illustrated in FIG. 6 (S101). Setting of storage destination devices in which to store printing data for pull printing is performed using the storage destination device setting screen 70.

The storage destination device setting screen 70 illustrated in FIG. 6 includes a primary server setting screen 71, a tab 72a for displaying a secondary server setting screen 72 (see FIG. 7), and an OK button 73 for completing setting. Setting of a primary server to be a first storage destination device is performed using the primary server setting screen 71. Setting of a secondary server to be a second storage destination device is performed using the secondary server setting screen 72. When the tab 72a is opened while in a state illustrated in FIG. 6, the storage destination device setting screen 70 shifts to a state illustrated in FIG. 7.

Figure 7:
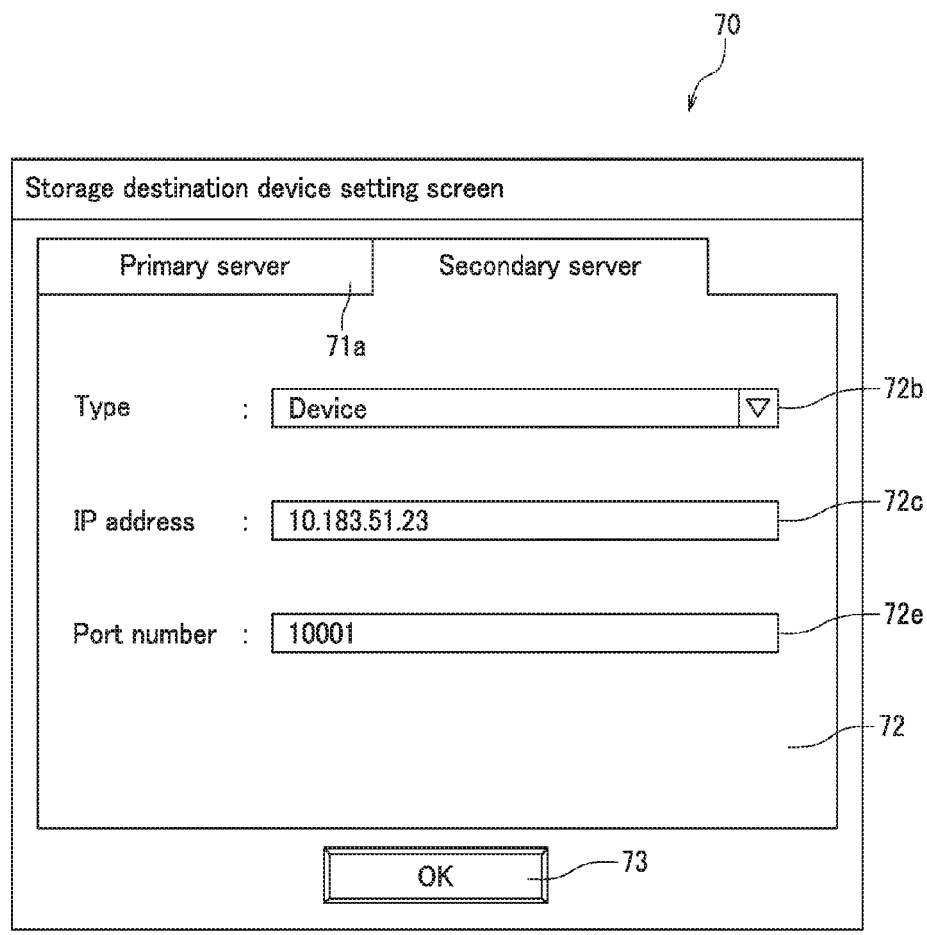
FIG. 7 is a diagram illustrating an example, which is different from that illustrated in FIG. 6, of the storage destination device setting screen that is displayed on the display section illustrated in FIG. 3.

The storage destination device setting screen 70 illustrated in FIG. 7 includes a tab 71a for displaying the primary server setting screen 71 (see FIG. 6), the secondary server setting screen 72, and the OK button 73 for completing setting. When the tab 71a is opened while in the state illustrated in FIG. 7, the storage destination device setting screen 70 shifts to the state illustrated in FIG. 6.

The primary server setting screen 71 illustrated in FIG. 6 includes a drop-down list 71b for specifying a type of the primary server. A value "Server", "Device", or "Device Cluster" can be selected from the drop-down list 71b. The server 20 (see FIG. 1) can be specified as the primary server by selecting "Server" from the drop-down list 71b. The image forming apparatus 40, 50, or 60 (see FIG. 1) can be specified as the primary server by selecting "Device" from the drop-down list 71b. A cluster of a plurality of image forming apparatuses can be specified as the primary server by selecting "Device Cluster" from the drop-down list 71b.

Information to be displayed below the drop-down list 71b in the primary server setting screen 71 is changed according to the value selected from the drop-down list 71b.

On the primary server setting screen 71 illustrated in FIG. 6, "Server" is being selected from the drop-down list 71b. When "Server" is being selected from the drop-down list 71b, the primary server setting screen 71 includes a text box 71c and a text box 71d. An internet protocol (IP) address of a server to function as the primary server is entered in the text box 71c. A name of a queue in the server specified in the text box 71c is entered in the text box 71d.

When "Server" is selected from the drop-down list 71b, the primary server is specified by a combination of the server specified in the text box 71c and the queue name specified in the text box 71d.

The line printer daemon protocol (LPR) is contemplated to be used as a communication protocol for printing data transmission by the primary server that is specified via selection of "Server" from the drop-down list 71b. It should be noted here that the LPR uses a fixed port number. Therefore, the primary server setting screen 71 illustrated in FIG. 6 is not configured to receive port number setting. However, in a configuration in which a protocol other than the LPR is used as a communication protocol by the primary server specified via selection of "Server" from the drop-down list 71b, the primary server setting screen 71 illustrated in FIG. 6 may include a text box in which a port number is to be entered.

As in the case of the primary server setting screen 71 described above, a value "Server" can be selected as a secondary server on the secondary server setting screen 72.

The secondary server setting screen 72 illustrated in FIG. 7 includes a drop-down list 72b for specifying a type of the secondary server. A value "Server", "Device", or "Device Cluster" can be selected from the drop-down list 72b. The server 20 (see FIG. 1) can be specified as the secondary server by selecting "Server" from the drop-down list 72b. The image forming apparatus 40, 50, or 60 (see FIG. 1) can be specified as the secondary server by selecting "Device" from the drop-down list 72b. A cluster of a plurality of image forming apparatuses can be specified as the secondary server by selecting "Device Cluster" from the drop-down list 72b.

Information to be displayed below the drop-down list 72b in the secondary server setting screen 72 is changed according to the value selected from the drop-down list 72b.

On the secondary server setting screen 72 illustrated in FIG. 7, "Device" is being selected from the drop-down list 72b. When "Device" is being selected from the drop-down list 72b, the secondary server setting screen 72 includes a text box 72c and a text box 72e. An IP address of an image forming apparatus to function as the secondary server is entered in the text box 72c. A port number in the image forming apparatus specified in the text box 72c is entered in the text box 72e. The RAW is contemplated to be used as a communication protocol for printing data transmission by the secondary server that is specified via selection of "Device" from the drop-down list 72b.

As in the case of the secondary server setting screen 72 described above, the value "Device" can be selected as the primary server on the primary server setting screen 71.

Figure 8:
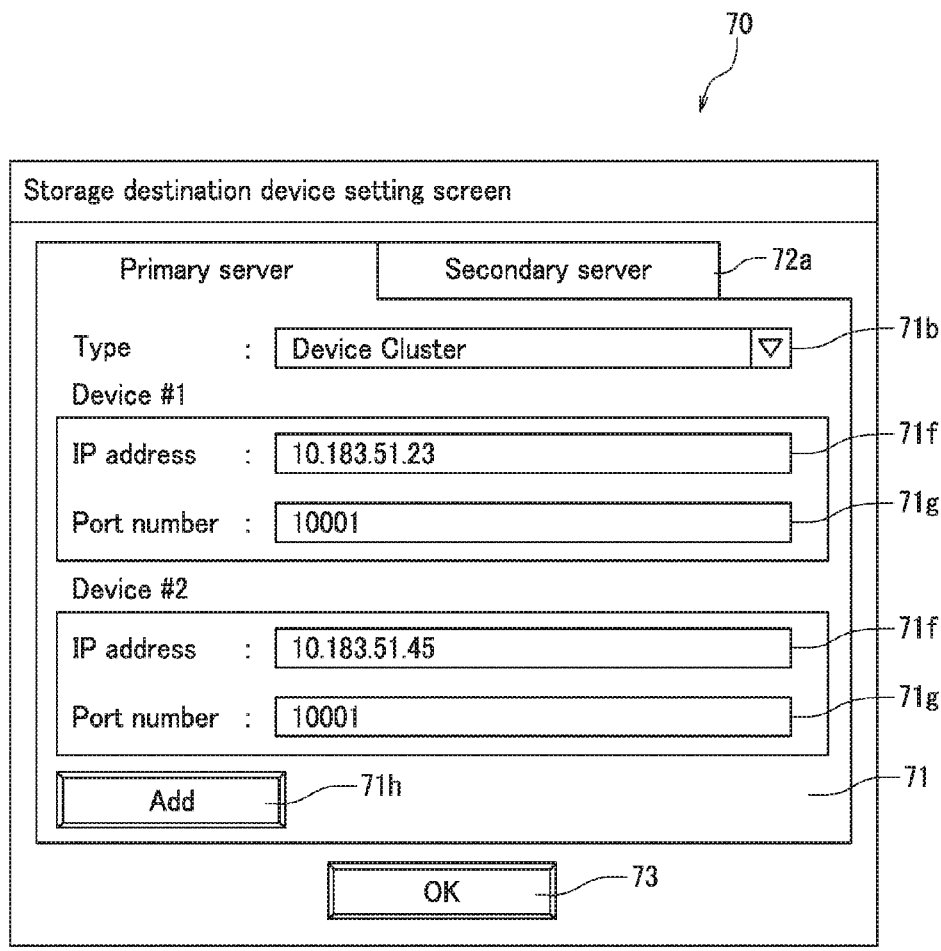
FIG. 8 is a diagram illustrating an example, which is different from those illustrated in FIGS. 6 and 7, of the storage destination device setting screen that is displayed on the display section illustrated in FIG. 3.

On the primary server setting screen 71 illustrated in FIG. 8, "Device Cluster" is being selected from the drop-down list 71b. When "Device Cluster" is being selected from the drop-down list 71b, the primary server setting screen 71 includes a text box 71f and a text box 71g for each image forming apparatus. An IP address of an image forming apparatus included in the cluster to function as the primary server is entered in the text box 71f. A port number in the image forming apparatus specified in the text box 71f is entered in the text box 71g. The RAW is contemplated to be used as a communication protocol for printing data transmission by the primary server that is specified via selection of "Device Cluster" from the drop-down list 71b.

When "Device Cluster" is being selected from the drop-down list 71b, the primary server setting screen 71 includes an Add button 71h. The Add button 71h is a button for adding another image forming apparatus to be included in the cluster to function as the primary server. When the Add button 71h is pressed, another text box 71f and another text box 71g for the additional image forming apparatus are added to the primary server setting screen 71.

As in the case of the primary server setting screen 71 described above, the value "Device Cluster" can be selected as the secondary server on the secondary server setting screen 72.

As described above, it is possible to set various combinations of a primary server and a secondary server on the storage destination device setting screen 70. Examples of the combinations include: a combination in which the primary server is a server and the secondary server is a server; a combination in which the primary server is a server and the secondary server is an image forming apparatus; a combination in which the primary server is a server and the secondary server is a cluster of a plurality of image forming apparatuses; a combination in which the primary server is an image forming apparatus and the secondary server is a server; a combination in which the primary server is an image forming apparatus and the secondary server is an image forming apparatus; a combination in which the primary server is an image forming apparatus and the secondary server is a cluster of a plurality of image forming apparatuses; a combination in which the primary server is a cluster of a plurality of image forming apparatuses and the secondary server is a server; a combination in which the primary server is a cluster of a plurality of image forming apparatuses and the secondary server is an image forming apparatus; and a combination in which the primary server is a cluster of a plurality of image forming apparatuses and the secondary server is a cluster of a plurality of image forming apparatuses.

After S101, as illustrated in FIG. 5, the port monitor 35a repeatedly determines whether or not the OK button 73 on the storage destination device setting screen 70 has been pressed until the OK button 73 is determined to be pressed (S102).

When determining in S102 that the OK button 73 has been pressed, the port monitor 35*a* stores in the storage section 34 setting details regarding the primary server and the secondary server entered on the storage destination device setting screen 70 (S103), and then the operation illustrated in FIG. 5 comes to an end.

Next, an operation of the printing data transmitter 30 for transmitting printing data for pull printing will be described.

When receiving an instruction to transmit printing data for pull printing via the operation section 31, the control section 35 causes generation of printing data for pull printing using the printer driver 34*a* and requests the port monitor 35*a* to transmit the generated printing data using the printer driver 34*a*. In response, the port monitor 35*a* transmits the printing data for pull printing based on the details of the setting made via the operation illustrated in FIG. 5.

For generating printing data, the printer driver 34*a* requests the server 20 to perform user authentication. The printer driver 34*a* then acquires from the server 20 information of printing authority (hereinafter, referred to as "authority information") of the user authenticated by the server 20 and generates printing data based on the acquired authority information. When the server 20 authenticates the user, the printer driver 34*a* stores information used for the user authentication (hereinafter, referred to as "authentication information") in the storage section 34. When acquiring the authority information of the user from the server 20, the printer driver 34*a* stores the acquired authority information in the storage section 34 on a user-by-user basis. In a case where the printer driver 34*a* fails to communicate with the server 20, the printer driver 34*a* itself performs user authentication based on the authentication information stored in the storage section 34 and acquires authority information of the authenticated user from the storage section 34.

An operation of the port monitor 35*a* for transmitting printing data for pull printing in a case where the primary server is the server 20 and the secondary server is the image forming apparatus 40 will be described as an example of transmission of printing data for pull printing.

Figure 9:
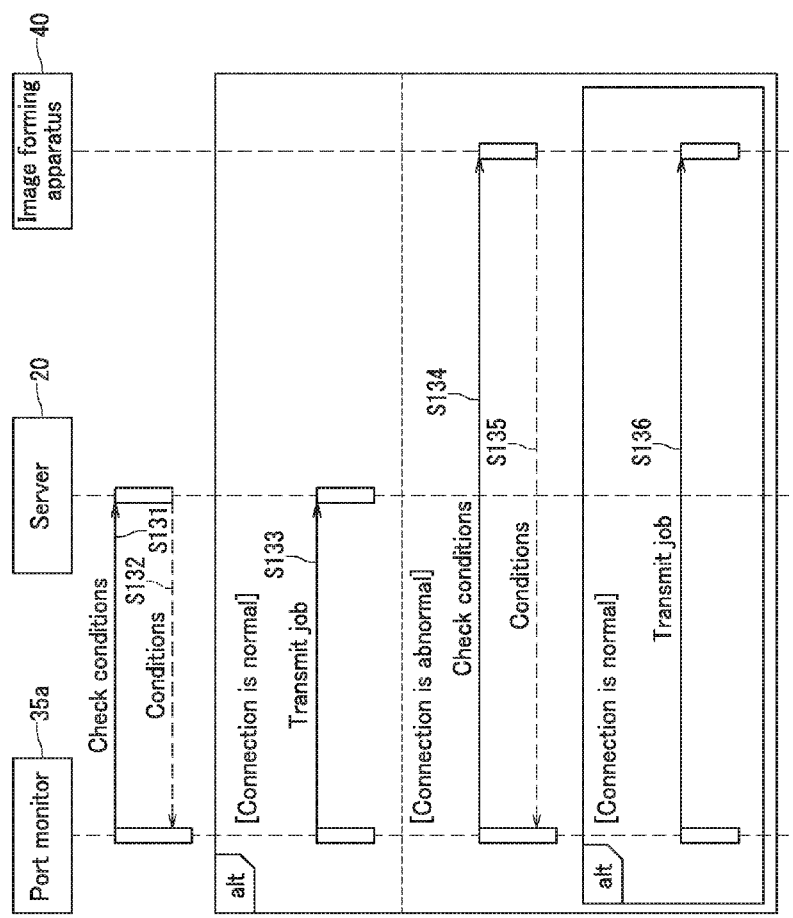
FIG. 9 is a sequence diagram of an operation of a port monitor illustrated in FIG. 3 for transmitting printing data for pull printing in a case where a primary server is a server and a secondary server is an image forming apparatus.

FIG. 9 is a sequence diagram of the operation of the port monitor 35*a* for transmitting printing data for pull printing in a case where the primary server is the server 20 and the secondary server is the image forming apparatus 40.

As illustrated in FIG. 9, the port monitor 35*a* checks with the server 20, which has been specified as the primary server, conditions of the server 20 (S131). In a case where the connection between the server 20 and the printing data transmitter 30 is normal, the server 20 notifies the port monitor 35*a* of the conditions of the server 20 (S132).

After S131, when being notified of the conditions of the server 20 in S132, that is, in a case where the connection between the server 20 and the printing data transmitter 30 is normal, the port monitor 35*a* transmits to the server 20 a job, that is, printing data for pull printing in association with identification information of the user who is currently logged in (hereinafter, referred to as "user ID") (S133), and then the operation illustrated in FIG. 9 comes to an end. Accordingly, the control section 25 of the server 20 stores, as printing data 24*a*, the printing data that has been transmitted from the port monitor 35*a* in association with the user ID that has been transmitted from the port monitor 35*a* in association with the printing data.

After S131, in a case where the conditions of the server 20 are not notified in S132, that is, in a case where the connection between the server 20 and the printing data transmitter 30 is abnormal, the port monitor 35*a* checks with the image forming apparatus 40, which has been specified as the secondary server, conditions of the image forming apparatus 40 (S134). In a case where the connection between the image forming apparatus 40 and the printing data transmitter 30 is normal, therefore, the image forming apparatus 40 notifies the port monitor 35*a* of the conditions of the image forming apparatus 40 (S135). The conditions of which the image forming apparatus 40 notifies the port monitor 35*a* include a remaining storage capacity of the storage section 47, the number of devices that are currently connected to the image forming apparatus 40, and information as to whether or not the image forming apparatus 40 is in an idle state.

After S135, when being notified of the conditions of the image forming apparatus 40 in S135, that is, in a case where the connection between the printing data transmitter 30 and the image forming apparatus 40 is normal, the port monitor 35*a* transmits to the image forming apparatus 40 a job, that is, printing data for pull printing in association with the user ID of the user who is currently logged in (S136), then the operation illustrated in FIG. 9 comes to an end. Accordingly, the control section 48 of the image forming apparatus 40 stores, as printing data 47*a*, the printing data that has been transmitted from the port monitor 35*a* in association with the user ID that has been transmitted from the port monitor 35*a* in association with the printing data.

After S135, in a case where the conditions of the image forming apparatus 40 is not notified in S135, that is, in a case where the connection between the image forming apparatus 40 and the printing data transmitter 30 is abnormal, the port monitor 35*a* cancels the transmission of printing data for pull printing, and then the operation illustrated in FIG. 9 comes to an end.

An operation of the port monitor 35*a* for transmitting printing data for pull printing in a case where the primary server is a cluster of the image forming apparatuses 40, 50, and 60 will be described as an example of transmission of printing data for pull printing.

Figure 10:
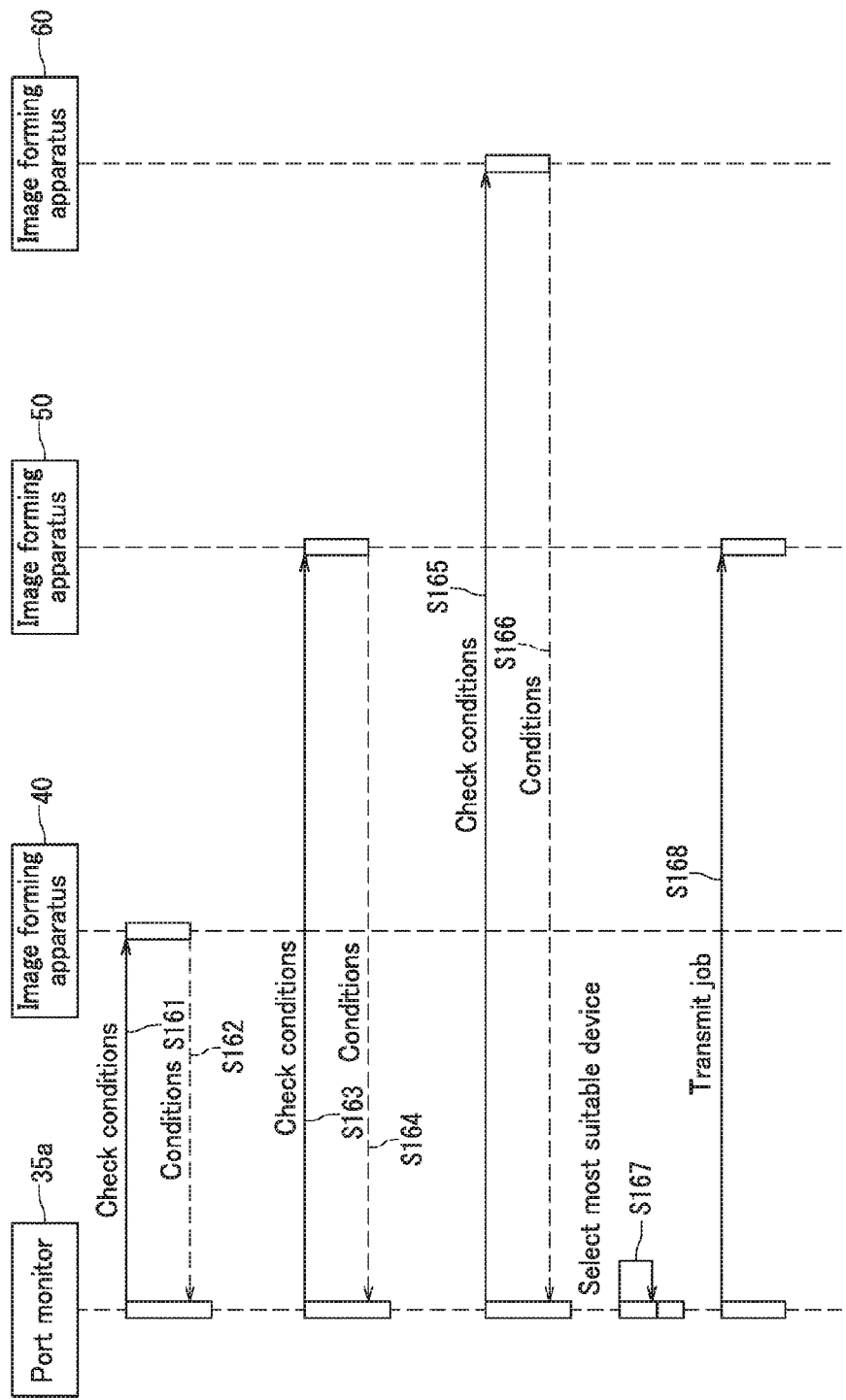
FIG. 10 is a sequence diagram of an operation of the port monitor illustrated in FIG. 3 for transmitting printing data for pull printing in a case where the primary server is a cluster of a plurality of image forming apparatuses.

FIG. 10 is a sequence diagram of an operation of the port monitor 35*a* for transmitting printing data for pull printing in a case where the primary server is a cluster of the image forming apparatuses 40, 50, and 60.

As illustrated in FIG. 10, the port monitor 35*a* checks with the image forming apparatus 40 of the cluster of the image forming apparatuses 40, 50, and 60, which has been specified as the primary server, conditions of the image forming apparatus 40 (5161). In a case where the connection between the image forming apparatus 40 and the printing data transmitter 30 is normal, therefore, the image forming apparatus 40 notifies the port monitor 35*a* of the conditions of the image forming apparatus 40 (S162). The conditions of which the image forming apparatus 40 notifies the port monitor 35*a* include a remaining storage capacity of the storage section 47, the number of devices that are currently connected to the image forming apparatus 40, and information as to whether or not the image forming apparatus 40 is in an idle state.

After S162, the port monitor 35*a* checks with the image forming apparatus 50 of the cluster of the image forming apparatuses 40, 50, and 60, which has been specified as the primary server, conditions of the image forming apparatus 50 (S163). In a case where the connection between the image forming apparatus 50 and the printing data transmitter 30 is normal, therefore, the image forming apparatus 50 notifies the port monitor 35*a* of the conditions of the image forming apparatus 50 (S164). The conditions of which the image forming apparatus 50 notifies the port monitor 35*a* include a remaining storage capacity of the storage section of the image forming apparatus 50, the number of devices that are currently connected to the image forming apparatus 50, and information as to whether or not the image forming apparatus 50 is in an idle state.

After S164, the port monitor 35*a* checks with the image forming apparatus 60 of the cluster of the image forming apparatuses 40, 50, and 60, which has been specified as the primary server, conditions of the image forming apparatus 60 (S165). In a case where the connection between the image forming apparatus 60 and the printing data transmitter 30 is normal, therefore, the image forming apparatus 60 notifies the port monitor 35*a* of the conditions of the image forming apparatus 60 (S166). The conditions of which the image forming apparatus 60 notifies the port monitor 35*a* include a remaining storage capacity of the storage section of the image forming apparatus 60, the number of devices that are currently connected to the image forming apparatus 60, and information as to whether or not the image forming apparatus 60 is in an idle state. That is, at least one of the specific conditions is one of the remaining storage capacity of each of the image forming apparatuses 40, 50, and 60, the number of devices that are currently connected to each of the image forming apparatuses 40, 50, and 60, and information as to whether or not each of the image forming apparatuses 40, 50, and 60 is in an idle state.

After S166, the port monitor 35*a* selects an image forming apparatus that is most suitable as a storage destination device in which to store printing data for pull printing from among the cluster of the image forming apparatuses 40, 50, and 60 based on the conditions of the image forming apparatus 40 that have been notified from the image forming apparatus 40 in S162, the conditions of the image forming apparatus 50 that have been notified from the image forming apparatus 50 in S164, and the conditions of the image forming apparatus 60 that have been notified from the image forming apparatus 60 in S166 (S167).

Figure 11:
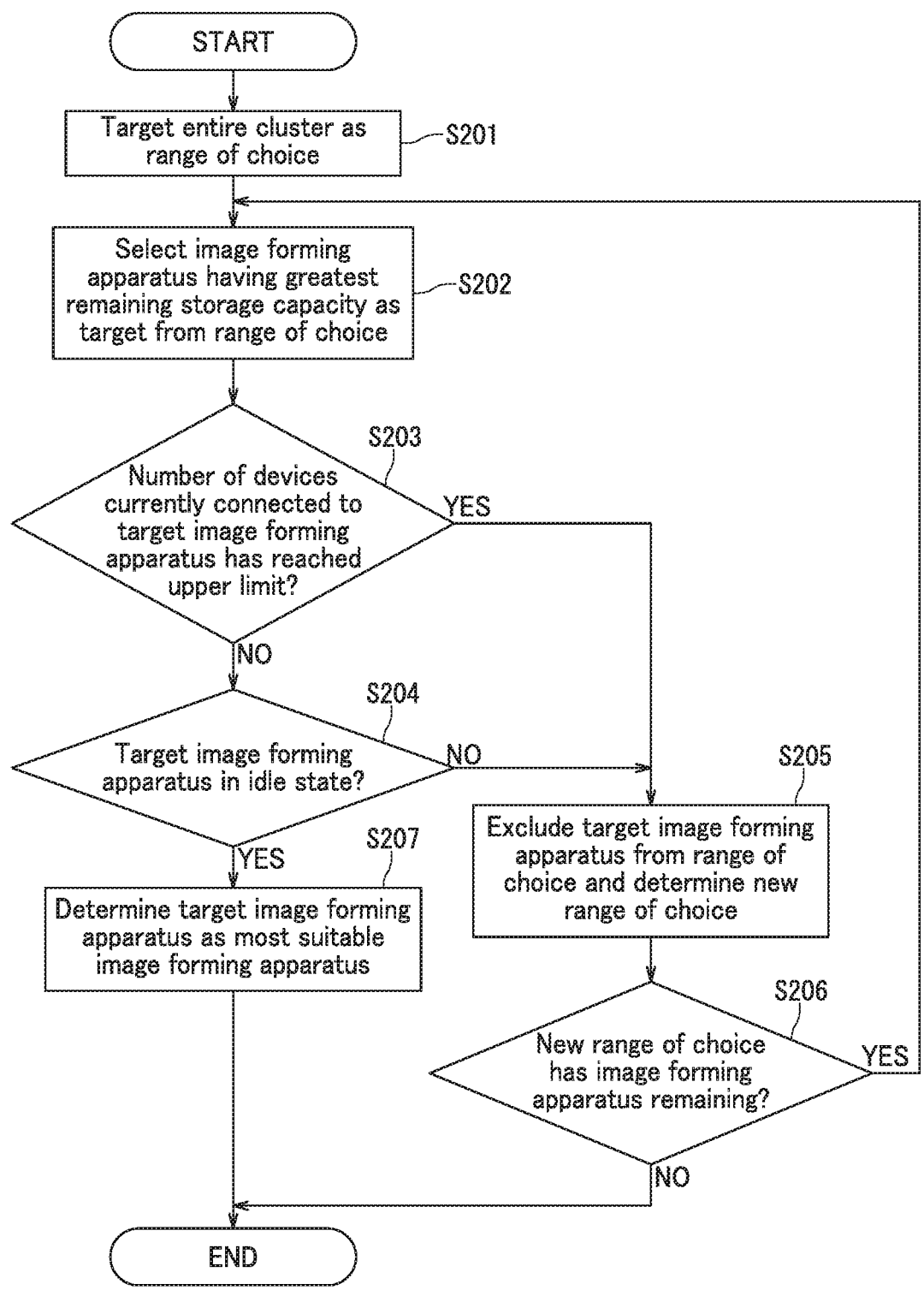
FIG. 11 is a flowchart of an operation of the port monitor illustrated in FIG. 3 for selecting the most suitable image forming apparatus.

FIG. 11 is a flowchart of an operation of the port monitor 35*a* for selecting the most suitable image forming apparatus.

In S167 in FIG. 10, the port monitor 35*a* performs an operation illustrated in FIG. 11.

As illustrated in FIG. 11, the port monitor 35*a* targets the entire cluster of the image forming apparatuses 40, 50, and 60 as a range of choice (S201).

Next, the port monitor 35*a* selects an image forming apparatus in which the storage section has the greatest remaining storage capacity as a target image forming apparatus from the range of choice based on the conditions of the image forming apparatus 40 that have been notified from the image forming apparatus 40 in S162, the conditions of the image forming apparatus 50 that have been notified from the image forming apparatus 50 in S164, and the conditions of the image forming apparatus 60 that have been notified from the image forming apparatus 60 in S166 (S202).

Next, the port monitor 35*a* determines whether or not the number of devices that are currently connected to the target image forming apparatus has reached an upper limit based on the conditions of the image forming apparatus 40 that have been notified from the image forming apparatus 40 in S162, the conditions of the image forming apparatus 50 that have been notified from the image forming apparatus 50 in S164, and the conditions of the image forming apparatus 60 that have been notified from the image forming apparatus 60 in S166 (S203).

When determining in S203 that the number of devices that are currently connected to the target image forming apparatus has not reached the upper limit, the port monitor 35*a* determines whether or not the target image forming apparatus is in an idle state based on the conditions of the image forming apparatus 40 that have been notified from the image forming apparatus 40 in S162, the conditions of the image forming apparatus 50 that have been notified from the image forming apparatus 50 in S164, and the conditions of the image forming apparatus 60 that have been notified from the image forming apparatus 60 in S166 (S204).

When determining in S203 that the number has reached the upper limit or determining in S204 that the target image forming apparatus is not in an idle state, the port monitor 35*a* excludes the target image forming apparatus from the range of choice and determines a new range of choice (S205). Next, the port monitor 35*a* determines whether or not the new range of choice has any image forming apparatuses remaining therein (S206).

When determining in S206 that the new range of choice has one or more image forming apparatuses remaining therein, the port monitor 35*a* performs S202 again, targeting the new range of choice.

When the port monitor 35*a* determines in S206 that the new range of choice does not have any image forming apparatus remaining therein, the operation illustrated in FIG. 11 comes to an end.

When determining in S204 that the target image forming apparatus is in an idle state, the port monitor 35*a* determines the target image forming apparatus as the most suitable image forming apparatus (S207), and then the operation illustrated in FIG. 11 comes to an end.

The following describes for example the case where the image forming apparatus 40 is in an idle state in which the storage section 47 has a remaining storage capacity of 150 MB and four devices are currently connected to the image forming apparatus 40, the image forming apparatus 50 is in an idle state in which the storage section has a remaining storage capacity of 769 MB and two devices are currently connected to the image forming apparatus 50, and the image forming apparatus 60 is in an idle state in which the storage section has a remaining storage capacity of 901 MB and 10 devices are currently connected to the image forming apparatus 60. The upper limit of the number of devices that are currently connected to each of the image forming apparatuses 40, 50, 60 is 10. In the operation illustrated in FIG. 11, the port monitor 35*a* first selects the image forming apparatus 60, in which the storage section has the greatest remaining storage capacity, as a target image forming apparatus from the cluster of the image forming apparatuses 40, 50, and 60 (S202). However, since the number of devices that are currently connected to the image forming apparatus 60 has reached the upper limit of 10 (YES in S203), the port monitor 35*a* excludes the image forming apparatus 60 and selects the image forming apparatus 50, in which the storage section has the greatest remaining storage capacity among the image forming apparatuses 40 and 50, as a target image forming apparatus (S202). Since the number of devices that are currently connected to the image forming apparatus 50 has not reached the upper limit of 10 (NO in S203) and the image forming apparatus 50 is in an idle state (YES in S204), the port monitor 35*a* determines the image forming apparatus 50 as the most suitable image forming apparatus (S207).

As illustrated in FIG. 10, when determining in S167 that the image forming apparatus 50 is the most suitable image forming apparatus, for example, the port monitor 35*a* transmits to the image forming apparatus 50 the printing data for pull printing in association with the user ID of the user who is currently logged in (S168), and then the operation illustrated in FIG. 10 comes to an end. Accordingly, the control section of the image forming apparatus 50 stores in the storage section of the image forming apparatus 50 the printing data that has been transmitted from the port monitor 35*a* in association with the user ID that has been transmitted from the port monitor 35*a* in association with the printing data.

In a case where no most suitable image forming apparatus is determined in S167, the port monitor 35*a* cancels the transmission of the printing data for pull printing, and then the operation illustrated in FIG. 10 comes to an end.

Next, an operation of the pull printing system 10 for executing printing based on printing data for pull printing will be described.

It should be noted that one of the plurality of image forming apparatuses connected to the network 12 (see FIG. 1) is a master device that manages all printing data for pull printing stored in the image forming apparatuses connected to the network 12. Hereinafter, the description will be made on the assumption that the image forming apparatus 40 is the master device. In order to have printing data for pull printing stored, each of the image forming apparatuses connected to the network 12 such as the image forming apparatuses 50 and 60 transmits to the image forming apparatus 40 being the master device, a user ID associated with the printing data, a job ID being identification information of the printing data, and a device ID being identification information of the image forming apparatus itself in association with one another. The image forming apparatus 40 can therefore store a list 80 such as shown in FIG. 12 in the storage section 47. In FIG. 12, devices IDs "1", "2", and "3" correspond to the image forming apparatuses 40, 50, and 60, respectively.

The following describes an operation of the pull printing system 10 in a case where the image forming apparatus 60 performs printing based on printing data for pull printing.

When receiving user information inputted via the operation section of the image forming apparatus 60, the image forming apparatus 60 requests the server 20 to perform user authentication. The image forming apparatus 60 then acquires from the server 20 authority information of the user authenticated by the server 20 and permits only printing in accordance with the authority information acquired.

Figure 13:
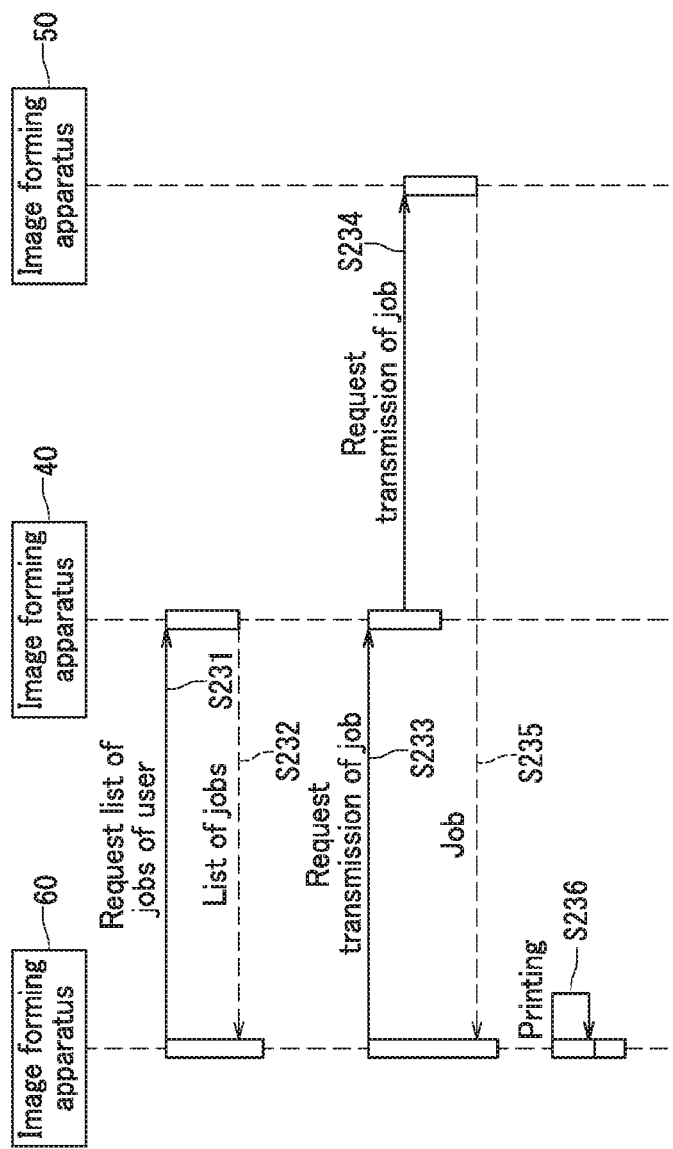
FIG. 13 is a sequence diagram of an operation of the pull printing system illustrated in FIG. 1 in a case where an image forming apparatus performs printing based on printing data for pull printing.

FIG. 13 is a sequence diagram of an operation of the pull printing system 10 in a case where the image forming apparatus 60 performs printing based on printing data for pull printing.

Figure 14:
FIG. 14 is a diagram illustrating an example of a list that is generated by the image forming apparatus illustrated in FIG. 4.

As illustrated in FIG. 13, when the server 20 authenticates the user, the image forming apparatus 60 requests a list of jobs of the user from the image forming apparatus 40 by transmitting a user ID of the user authenticated by the server 20 to the image forming apparatus 40 being the master device (S231). In response, the image forming apparatus 40 sends to the image forming apparatus 60 a list 90 of the jobs (see FIG. 14) associated with the user ID transmitted in S231 out of the list 80 shown in FIG. 12 (S232). The list 90 shown in FIG. 14 is a list to be sent in a case where the user ID is "001".

The image forming apparatus 60 displays the list 90 sent in S232 on the display section of the image forming apparatus 60. When a job is selected via the operation section of the image forming apparatus 60, the image forming apparatus 60 requests the image forming apparatus 40 to transmit the job by transmitting the job ID of the selected job to the image forming apparatus 40 being the master device (S233).

Hereinafter, the description will be made on the assumption that a job of job ID "035" is requested. The image forming apparatus 40 recognizes that the job of job ID "035" is stored in an image forming apparatus of device ID "2", that is, in the image forming apparatus 50 based on the job ID "035" of the job requested in S233 and the list 80. The image forming apparatus 40 then requests the image forming apparatus 50 to transmit the job of job ID "035" to the image forming apparatus 60 (S234). In response, the image forming apparatus 50 retrieves the job of job ID "035", that is, printing data for pull printing from the storage section of the image forming apparatus 50 and transmits the job to the image forming apparatus 60 (S235).

When receiving the printing data corresponding to the job of job ID "035" transmitted in S235, the image forming apparatus 60 performs printing based on the transmitted printing data using a printer of the image forming apparatus 60 (S236), and then the operation illustrated in FIG. 13 comes to an end.

Although printing based on printing data for pull printing stored in an image forming apparatus is described above, a user can also perform printing based on printing data for pull printing stored in the server 20. In a case where the image forming apparatus 60 performs printing based on printing data for pull printing stored in the server 20, however, the server 20 sends only a list of printing data stored in the server 20 itself to the image forming apparatus 60.

Furthermore, although printing from the image forming apparatus 60 is described above, a user can also perform printing from an image forming apparatus other than the image forming apparatus 60 such as the image forming apparatuses 40 and 50.

Since the printing data transmitter 30 automatically transmits printing data to the secondary server in a case where transmission of the printing data to the primary server fails as described above, it is possible to improve system availability.

When transmission of printing data to the primary server fails due to an error in the communication between the printing data transmitter 30 and the primary server, a possibility that transmission of the printing data to the secondary server also fails due to an error in the communication between the printing data transmitter 30 and the secondary server can be reduced in a case where the primary server and the secondary server are connected to different networks. Thus, it is possible to improve availability of the pull printing system 10.

In a case where a storage destination device in which to store printing data for pull printing is connected to the network 12 to which the printing data transmitter 30 is connected, a possibility of an error in the communication between the printing data transmitter 30 and the storage destination device can be reduced. Thus, it is possible to improve availability of the pull printing system 10. Furthermore, in a case where a storage destination device in which to store printing data for pull printing is connected to the network 12 to which the printing data transmitter 30 is connected, the printing data transmitter 30 can communicate with the storage destination device in which to store printing data for pull printing within the network 12. Accordingly, network bandwidth between the network 12 and another network does not have to be high, and reliability of the connection between the network 12 and another network does not have to be high. In particular, in a case where a storage destination device in which to store printing data for pull printing is connected only to the network 12 to which the printing data transmitter 30 is connected, the volume of the communication between the network 12 and the network 11 can be reduced.

In a case where the secondary server is connected to the network 12 to which the printing data transmitter 30 is connected, a possibility of an error in the communication between the printing data transmitter 30 and the secondary server can be reduced. Thus, it is possible to improve availability of the pull printing system 10. Furthermore, in a case where the secondary server is connected to the network 12 to which the printing data transmitter 30 is connected, the printing data transmitter 30 can communicate with the secondary server within the network 12. Accordingly, network bandwidth between the network 12 and another network does not have to be high, and reliability of the connection between the network 12 and another network does not have to be high.

In a case where a storage destination device in which to store printing data for pull printing is an image forming apparatus, the printing data transmitter 30 does not need a dedicated server prepared as a storage destination device for storing the printing data for pull printing. Thus, it is possible to achieve highly-available pull printing with a simple configuration.

In particular, in a case where the secondary server is an image forming apparatus, the printing data transmitter 30 does not need a dedicated server prepared as the secondary server for storing the printing data for pull printing. Thus, the printing data transmitter 30 can achieve highly-available pull printing with a simple configuration.

The printing data transmitter 30 selects a storage destination device to which to actually transmit printing data for pull printing from among a plurality of storage destination devices based on specific conditions of each of the plurality of storage destination devices and on specific requirements with respect to the specific conditions (S167). Thus, it is possible to reduce a possibility for the printing data transmitter 30 to fail in transmission of the printing data to the storage destination device. As a result, it is possible to improve availability of the pull printing system 10.

The printing data transmitter 30 preferentially selects a storage destination device having the greatest remaining storage capacity as a storage destination device to which to actually transmit printing data for pull printing (S202). Thus, it is possible to reduce a possibility for the printing data transmitter 30 to fail in transmission of the printing data to the storage destination device. As a result, it is possible to improve availability of the pull printing system 10. Furthermore, the printing data transmitter 30 preferentially selects a storage destination device having the greatest remaining storage capacity as a storage destination device to which to actually transmit printing data for pull printing. The printing data transmitter 30 can therefore appropriately divide a storage capacity to be borne for storing printing data for pull printing between a plurality of storage destination devices. As a result, it is possible to fully utilize capability of the plurality of storage destination devices.

The printing data transmitter 30 preferentially selects a storage destination device in which the number of devices that are currently connected thereto has not reached the upper limit as a storage destination device to which to actually transmit printing data for pull printing (NO in S203). Thus, it is possible to reduce a possibility for the printing data transmitter 30 to fail in transmission of the printing data to the storage destination device. As a result, it is possible to improve availability of the pull printing system 10.

The printing data transmitter 30 preferentially selects a storage destination device that is in an idle state as a storage destination device to which to actually transmit printing data for pull printing (YES in S204). Thus, it is possible to reduce a possibility for the printing data transmitter 30 to fail in transmission of the printing data to the storage destination device. As a result, it is possible to improve availability of the pull printing system 10.

What is claimed is:

1. A pull printing system comprising:
a server being a first computer that stores printing data for pull printing;
a plurality of image forming apparatuses that each have a storage and that store the printing data for the pull printing; and
a printing data transmitter being a second computer that transmits the printing data for the pull printing to one of a plurality of storage destination devices, wherein
the server performs user authentication for a user of the printing data transmitter,
the printing data transmitter includes a Central Processing Unit (CPU) and a storage,
the storage in the printing data transmitter includes a printer driver for generating the printing data for the pull printing, and a data transmission program for transmitting the printing data for the pull printing to one of the plurality of storage destination devices,
the CPU in the printing data transmitter functions as a port monitor by executing the data transmission program,
the port monitor selects a first storage destination device and a second storage destination device as storage destination devices from among the plurality of storage destination devices,
the port monitor selects, as each of the first storage destination device and the second destination device, the server, one of the plurality of image forming apparatuses, or a cluster of the plurality of image forming apparatuses,
the port monitor, when a connection between the first storage destination device and the printing data transmitter is normal, transmits the printing data for the pull printing to the first storage destination device,
the port monitor, when the connection between the first storage destination device and the printing data transmitter is abnormal, transmits the printing data for the pull printing to the second storage destination device,
the port monitor, when one of the first storage destination device and the second storage destination device is the cluster of the plurality of image forming apparatuses, checks specific conditions of each image forming apparatus of the cluster of the plurality of image forming apparatuses,
each image forming apparatus of the cluster of the plurality of image forming apparatuses, when a connection between the image forming apparatus and the printing data transmitter is normal, notifies the port monitor of the specific conditions thereof,
the specific conditions of each image forming apparatus of the cluster of the plurality of image forming apparatuses include a remaining storage capacity of the storage of the image forming apparatus, the number of devices that are currently connected to the image forming apparatus, and information as to whether or not the image forming apparatus is in an idle state,
the port monitor selects one image forming apparatus of the cluster of the plurality of image forming apparatuses which has the greatest remaining storage capacity of the storage, in which the number of devices that are currently connected thereto has not reached an upper limit, or which is in the idle state, as the storage destination device to which to transmit the printing data for the pull printing, and at least one of the plurality of image forming apparatuses performs printing based on the printing data for the pull printing transmitted to and stored in the first storage destination device or the second storage destination device.

2. The pull printing system according to claim 1, wherein the plurality of image forming apparatuses and the data transmitter are connected to a first network being a local area network (LAN), and the server is connected to a second network being a LAN, and the first network and the second network are connected by the Internet.

3. The pull printing system according to claim 1, wherein the CPU in the printing data transmitter causes the printer driver to:

request the server to perform user authentication;

acquire from the server authority information, the authority information being information of printing authority; and generate the printing data for the pull printing based on the acquired authority information.

4. The pull printing system according to claim 3, wherein the CPU further causes the printer driver to:

store, when the server authenticates the user, authentication information in the storage of the printing data transmitter, the authentication information being information used for the user authentication;

perform, when the CPU fails to communicate with the server, the user authentication based on the authentication information stored in the storage of the printing data transmitter; and generate the printing data for the pull printing based on the authentication information stored in the storage of the printing data transmitter.

5. The pull printing system according to claim 1, wherein the plurality of image forming apparatuses include:

a first image forming apparatus that manages the printing data for the pull printing stored in the plurality of image forming apparatuses;

a second image forming apparatus that is operated by a user; and a third image forming apparatus that stores image data for pull printing desired by the user, the first image forming apparatus stores the image data for the pull printing of the user in association with identification information of the user, upon receiving input of information of the user, the second image forming apparatus requests the server to perform user authentication for the user, upon the server authenticating the user, the second image forming apparatus transmits the identification information of the authenticated user to the first image forming apparatus, in response, the first image forming apparatus sends a list of the printing data for the pull printing associated with the identification information to the second image forming apparatus, the second image forming apparatus refers to the list, selects the image data for the pull printing desired by the user, and transmits identification information of the selected printing data for the pull printing to the first image forming apparatus, the first image forming apparatus recognizes that the printing data for the pull printing desired by the user is stored in the third image forming apparatus based on the identification information of the printing data for the pull printing selected and transmitted by the second image forming apparatus, the first image forming apparatus requests the third image forming apparatus to transmit, to the second image forming apparatus, the printing data for the pull printing associated with the identification information of the printing data for the pull printing desired by the user, the third image forming apparatus transmits the printing data for the pull printing desired by the user to the second image forming apparatus, and the second image forming apparatus performs printing based on the printing data for the pull printing transmitted by the third image forming apparatus.

6. The pull printing system according to claim 5, wherein one of the first image forming apparatus and the third image forming apparatus is operated by the user to perform printing based on the printing data for the pull printing desired by the user.

* * * * *